UNITED STATES PATENT OFFICE.

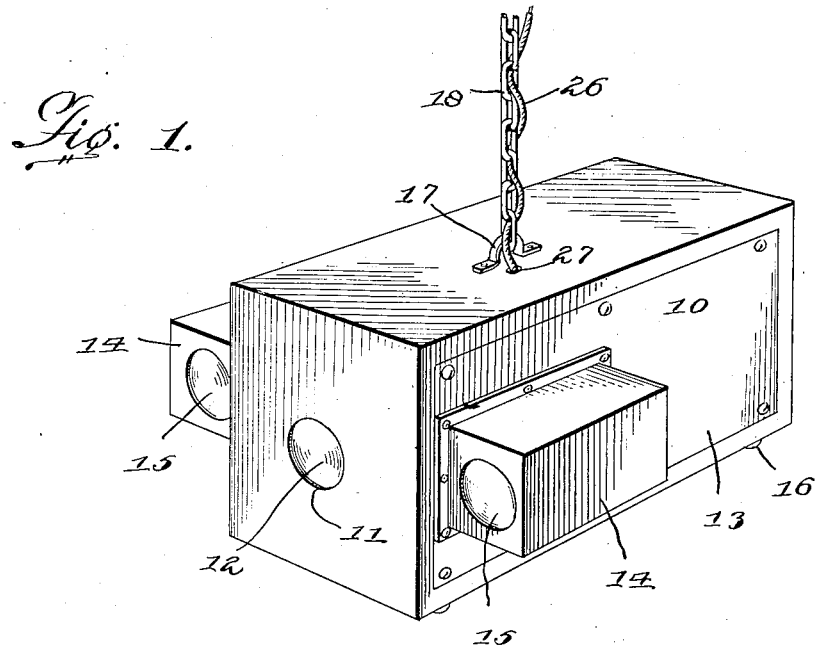
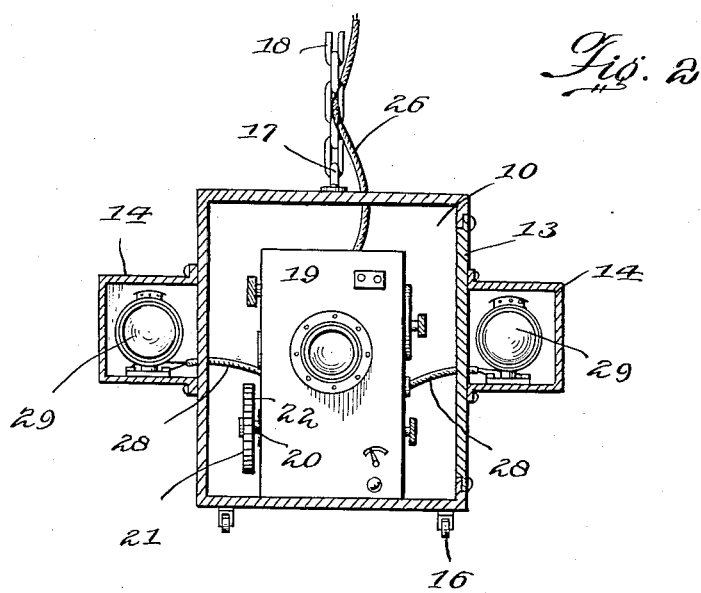

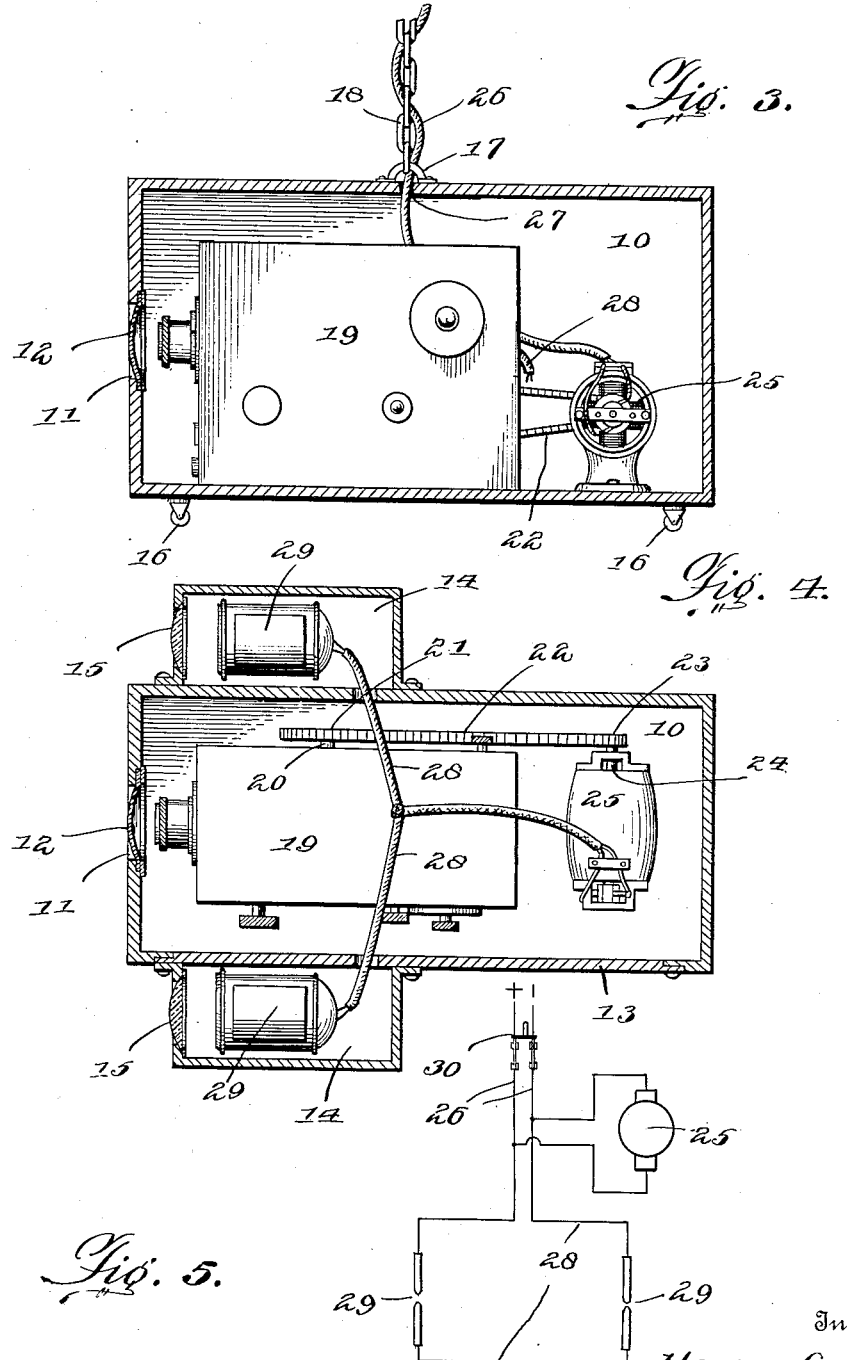

HENRY GRUEN, OF NEW YORK, N. Y.

SUBMARINE CAMERA.

1,122,104. Specification of Letters Patent. Patented Dec. 22, 1914.

Application filed December 13, 1913. Serial No. 806,561.

*To all whom it may concern:*

Be it known that I, HENRY GRUEN, a citizen of the United States, residing at New York, in the county of New York and State of New York, have invented new and useful Improvements in Submarine Cameras, of which the following is a specification.

The invention relates to cameras, and has for an object to provide a camera for use in taking pictures of objects or things below the surface of the water.

The invention contemplates, among other features, the provision of a camera of the motion picture type and in the use of which it is possible to obtain moving pictures of sea life, sunken bodies or other objects without endangering human lives. Repeated efforts to obtain animated pictures of deep sea life have resulted disastrously and the resulting pictures have been imperfect for proper production. In the use of my device I aim to provide a simple structure whereby a motion picture camera can be lowered to any desirable depth for the purpose of taking motion pictures of deep sea life or sunken objects and which can be manipulated from the surface and will not necessitate the services of a diver.

In the further disclosure of the invention reference is to be had to the accompanying drawings, constituting a part of this specification, in which similar characters of reference denote corresponding parts in all the views, and in which:

Figure 1 is a perspective view of the camera; Fig. 2 is a vertical transverse sectional view; Fig. 3 is a vertical longitudinal sectional view; Fig. 4 is a horizontal sectional view taken on the line 4—4 in Fig. 3; and Fig. 5 is a diagrammatic view of the electric circuit.

Referring more particularly to the views, I provide a main casing 10 preferably of a rectangular configuration and having at its front an aperture 11 suitably covered by a lens or glass 12, one side of the casing 10 being open and adapted to be normally closed by a suitable cover 13 which is adapted to be secured in position to form a water proof joint so as to prevent the entrance of water into the casing 10. A plurality of similar auxiliary casings 14 are supported on the sides of the casing 10, one of the said casings having a portion thereof preferably secured to the cover 13 as shown, and the said casings being each provided with a bull's eye or other lens 15 arranged in the front faces of the casings. Suitable casters 16 are provided on the under side of the casing and the top of the casing has secured thereto a member 17, to which is preferably attached a suitable strong chain 18 whereby the casing can be lowered into the water.

Suitably supported within the casing 10 is a camera body 19 preferably of the motion picture type camera, the said camera body including the usual driving shaft 20 and which, in this instance, instead of having a crank shaft attached thereto, has a toothed wheel 21 keyed on a projecting end thereof and over which passes a chain 22 meshing with a toothed wheel 23 carried on a shaft 24 of a suitable motor 25 supported within the main casing 10. An electric cable or other conducting wire 26 is wound around or twisted on to the chain 18 and enters the casing 10 through an aperture 27 which can be preferably filled with sealing wax or some other water proof material in order to prevent water from entering the casing. The said wire 26 has suitable connection with the motor 25 for operating the same, and by means of auxiliary wires 28 current is carried from the motor 25 to a plurality of illuminating members 29 in the nature of electric lamps, situated within the auxiliary casings 14. At the upper end of the chain 18 the wire 26 terminates in a suitable switch 30 which has connection with a source of electrical energy whereby, when the switch is closed, an electric circuit to the motor and the illuminating members will be completed so as to place the motor in operation to actuate the motion picture machine while current will also be supplied to the illuminating members which, through the medium of the lens 15, will project strong rays of light forwardly beyond the casing 10 so as to illuminate and light up those objects and things which are to be photographed by the camera within the casing.

From the foregoing description, it will be apparent that the device described can be lowered to any suitable depth in the water; that at the moment the circuit is closed the camera body will be placed in picture taking operation, while at the same time the electric lights will project rays of light to points within the focus of the camera body so as to properly illuminate the same and permit of taking efficient pictures of sea life or other objects beneath the level of the water.

Having thus described my invention, I claim:

In a submarine camera, a main casing provided with an opening closed by a transparent plate, a camera arranged in said casing, with its lens alined with said plate, auxiliary casings, one arranged on each side of the main casing, said auxiliary casings being provided with openings closed by transparent plates, electric lamps disposed in the auxiliary casings to have their rays project through said transparent plates, a motor in the main casing, means connecting the motor with the camera for operating the same, and an electric circuit comprising wires passing into the main casing and connecting with the electric lamps in the auxiliary casings, said wires having branch wires connecting with the said motor whereby, when the circuit is closed, the said electric lamps will be illuminated and the motor simultaneously operated to actuate the camera.

In testimony whereof I affix my signature in presence of two witnesses.

HENRY GRUEN.

Witnesses:
FREDERICK H. FABIAN,
ADOLPH LASCHIVER.